United States Patent
Hand et al.

(10) Patent No.: US 12,362,939 B2
(45) Date of Patent: Jul. 15, 2025

(54) SYSTEMS AND METHODS FOR DEMONSTRATING IDENTITY TO A TRUSTED PLATFORM MODULE

(71) Applicant: Google LLC, Mountain View, CA (US)

(72) Inventors: Jordan Thomas Hand, Woodinville, WA (US); Christopher Edward Fenner, Kirkland, WA (US); Jeffrey Thomas Andersen, Kirkland, WA (US); Vidya Bharat Satyamsetti, Bothell, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/250,851

(22) PCT Filed: Mar. 22, 2023

(86) PCT No.: PCT/US2023/015900
§ 371 (c)(1),
(2) Date: Apr. 27, 2023

(87) PCT Pub. No.: WO2023/183383
PCT Pub. Date: Sep. 28, 2023

(65) Prior Publication Data
US 2024/0333513 A1 Oct. 3, 2024

Related U.S. Application Data

(60) Provisional application No. 63/322,351, filed on Mar. 22, 2022.

(51) Int. Cl.
*H04L 9/32* (2006.01)
*H04L 9/08* (2006.01)

(52) U.S. Cl.
CPC ......... *H04L 9/3234* (2013.01); *H04L 9/0877* (2013.01); *H04L 9/3271* (2013.01)

(58) Field of Classification Search
None
See application file for complete search history.

(56) References Cited

U.S. PATENT DOCUMENTS

| 7,229,009 B1 | 6/2007 | Parsons et al. |
| 10,735,190 B1 * | 8/2020 | Khare ............... H04L 9/0877 |

(Continued)

OTHER PUBLICATIONS

Dasari et al., "Aegis: A Framework to Detect Compromised Components in the Supply Chain of Information Technology Infrastructure.", 2020 International Workshop on Big Data and Information Security (IWBIS), Depok, Indonesia, Oct. 17-18, 2020, pp. 159-164.

(Continued)

*Primary Examiner* — Benjamin E Lanier
(74) *Attorney, Agent, or Firm* — DORITY & MANNING P.A.

(57) ABSTRACT

The present disclosure provides systems and methods for demonstrating the identity of a central processing unit (CPU) to a Trusted Platform Module (TPM) with improved security against, for example, interposers on a communications bus. In particular, according to an aspect of the present disclosure, a CPU can generate a policy alias key that can be used to sign a challenge to prove the identity of the CPU to the TPM. Specifically, the policy alias key can be generated by the CPU by performing a key derivation function on a combined identity value generated by the CPU for the CPU and TPM. The combined identity value can be generated by the CPU from a CPU device identity value and a public endorsement key (EK) associated with the TPM.

19 Claims, 4 Drawing Sheets

(56) References Cited

U.S. PATENT DOCUMENTS

| | | | |
|---|---|---|---|
| 11,424,939 B1* | 8/2022 | Allen | H04L 9/3234 |
| 2018/0234255 A1* | 8/2018 | Fu | H04L 9/30 |
| 2019/0325140 A1 | 10/2019 | Alon et al. | |
| 2020/0313893 A1* | 10/2020 | Thom | H04L 63/14 |

OTHER PUBLICATIONS

International Search Report and Written Opinion for PCT/US2023/015900, mailed on Jun. 30, 2023, 17 pages.

International Preliminary Report on Patentability for Application No. PCT/US2023/015900, mailed Oct. 3, 2024, 11 pages.

* cited by examiner

SYSTEMS AND METHODS FOR DEMONSTRATING IDENTITY TO A TRUSTED PLATFORM MODULE

PRIORITY

The present application is based upon and claims the right of priority under 35 U.S.C. § 371 to International Application No. PCT/US2023/015900, filed Mar. 22, 2023, which claims the benefit of priority under 35 U.S.C. § 119 to U.S. Provisional Patent Application No. 63/322,351, filed Mar. 22, 2022. Applicant claims priority to and the benefit of each of such applications and incorporates all such applications herein by reference in their entirety.

FIELD

The present disclosure relates generally to security within a computing system featuring a Trusted Platform Module. More particularly, the present disclosure relates to systems and methods for demonstrating the identity of a central processing unit to a Trusted Platform Module.

BACKGROUND

A Trusted Platform Module (TPM) is a computer chip (e.g., microcontroller) that can securely store artifacts (e.g., secrets) used, for example, to authenticate a host platform (e.g., a central processing unit (CPU)). Example artifacts include passwords, certificates, or encryption keys. A TPM can also be used to store platform measurements that help ensure that the platform remains trustworthy. Authentication (e.g., ensuring that the platform can prove that it is what it claims to be) and attestation (a process helping to prove that a platform is trustworthy and has not been breached) can help to ensure safer computing in all environments.

However, in certain settings, TPM communications may be vulnerable to interposers that have access to communications occurring between the CPU and the TPM on a communications bus. As an example, if a TPM device and an attacker-controlled device are connected to the same plain-text communication path, the attacker can interpose (e.g., read or modify) any traffic that is exchanged between the CPU and the TPM device on the communication path. Thus, in such scenario, the attacker can hijack the communication to or from the TPM to learn secrets that can then be used to reveal data on the disk or to gain access to network resources. Additionally, in some scenarios, it is not evident to remote attestation verifiers that certain TPM actions took place between a specific CPU and TPM pairing.

SUMMARY

Aspects and advantages of embodiments of the present disclosure will be set forth in part in the following description, or can be learned from the description, or can be learned through practice of the embodiments.

One example aspect is directed to a computer system with improved security. The computer system includes a central processing unit (CPU) configured to communicate with a Trusted Platform Module (TPM) over a communications bus. The CPU is configured to perform CPU operations to prove its identity to the TPM. The CPU operations include performing a key derivation function using a CPU device identity value and a public endorsement key associated with the TPM to generate a combined identity value for the CPU and TPM. The CPU operations include performing a key derivation function on the combined identity value to generate a policy alias key. The CPU operations include receiving a challenge from the TPM. The CPU operations include signing the challenge with the policy alias key to generate a signed challenge. The CPU operations include returning the signed challenge to the TPM.

Another example aspect is directed to computer system with improved security. The computer system includes a Trusted Platform Module (TPM) configured to communicate with a central processing unit (CPU) over a communications bus. The TPM is configured to perform TPM operations to confirm an identity of the CPU. The TPM operations include providing a challenge to the CPU. The TPM operations include receiving a signed challenge from the CPU. The signed challenge includes the challenge signed by the CPU using a policy alias key. The policy alias key generated by the CPU by performance of a key derivation function on a combined identity value for the CPU and TPM. The combined identity value for the CPU and TPM generated by the CPU by performance of a key derivation function by the CPU on a CPU device identity value and a public endorsement key associated with the TPM. The TPM operations include performing an evaluation of the signed challenge. The TPM operations include when the signed challenge satisfies the evaluation, performing one or more operations requested by the CPU from the TPM.

Another example aspect is directed to a central processing unit (CPU) including computer-readable instructions that, when executed by the CPU, cause the CPU to perform CPU operations. The CPU operations include performing a key derivation function using a CPU device identity value and a public key associated with a Trusted Platform Module (TPM) to generate a combined identity value for the CPU and TPM. The CPU operations include performing a key derivation function on the combined identity value to generate a policy alias key. The CPU operations include receiving a challenge from the TPM. The CPU operations include signing the challenge with the policy alias key to generate a signed challenge. The CPU operations include returning the signed challenge to the TPM.

Another example aspect is directed to a computer system with improved security. The computer system includes a trusted computing base (TCB) comprising a plurality of layers of TCB components. The TCB is configured to communicate with a Trusted Platform Module (TPM) over a communications bus. The TCB is configured to perform TCB operations to prove identity to the TPM. The TCB operations include performing a key derivation function using a compound device identifier (CDI) value for the TCB and a public endorsement key associated with the TPM to generate a combined identity value for the TCB and TPM. The CDI value for the TCB includes a secret value resulting from the sequential application for each of the plurality of layers of TCB components of a cryptographic one-way function to a combination of a respective secret value for the layer and a measurement of a subsequent layer. The TCB operations include performing a key derivation function on the combined identity value to generate a policy alias key. The TCB operations include receiving a challenge from the TPM. The TCB operations include signing the challenge with the policy alias key to generate a signed challenge. The TCB operations include returning the signed challenge to the TPM.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
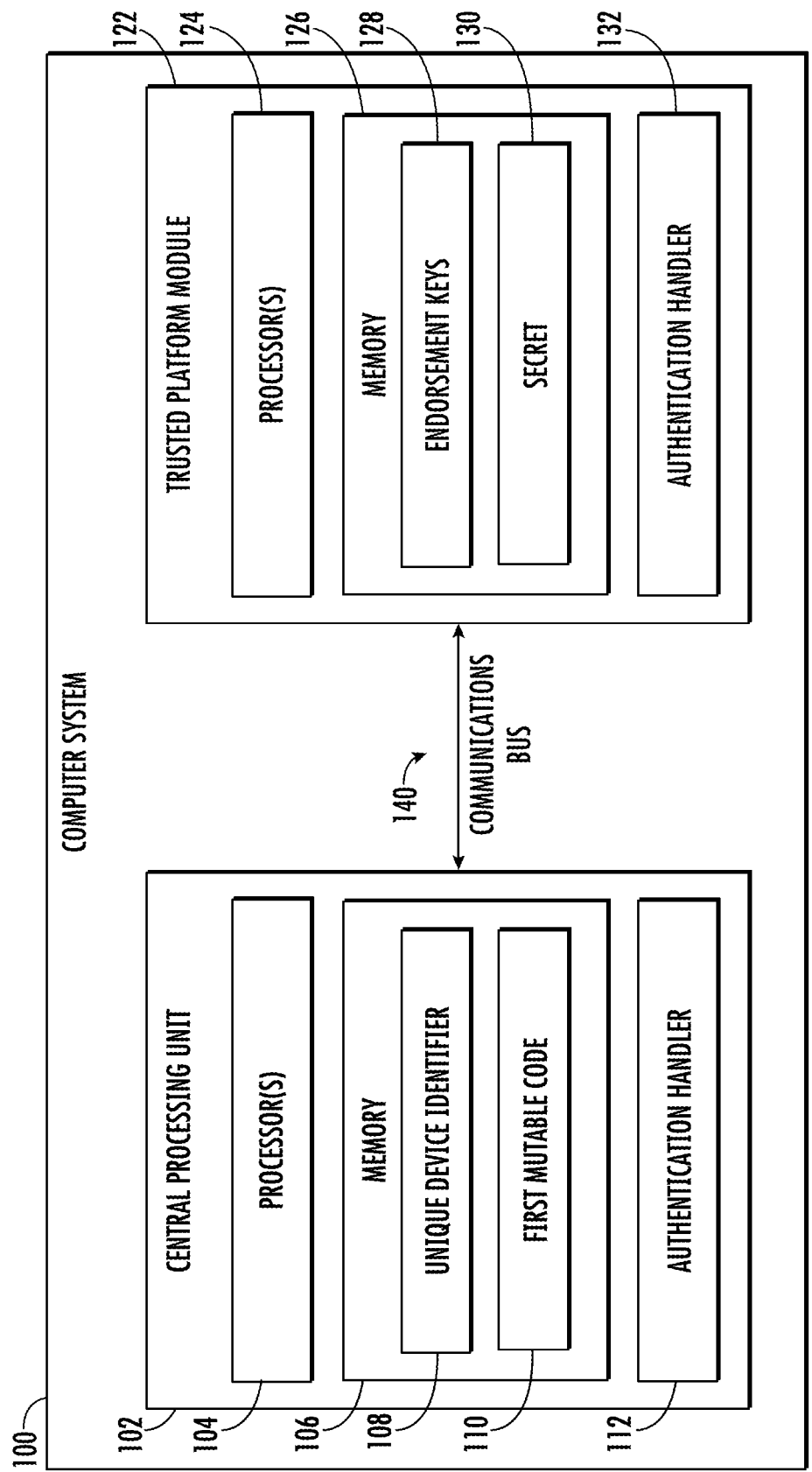
FIG. 1 depicts a block diagram of an example computing system according to example embodiments of the present disclosure.

Generally, the present disclosure is directed to systems and methods for demonstrating the identity of a central processing unit (CPU) to a Trusted Platform Module (TPM) with improved security against, for example, interposers on a communications bus. In particular, according to an aspect of the present disclosure, a CPU can generate a policy alias key that can be used to sign a challenge to prove the identity of the CPU to the TPM. Specifically, the policy alias key can be generated by the CPU by performing a key derivation function on a combined identity value generated by the CPU for the CPU and TPM. The combined identity value can be generated by the CPU from a CPU device identity value and a public endorsement key (EK) associated with the TPM.

Because the CPU uses the public endorsement key associated with a particular TPM in the policy alias key generation process, the resulting policy alias key can be specifically tailored for that particular TPM (e.g., because only that particular TPM has the corresponding private endorsement key). Likewise, the actual CPU device identity value used to generate the policy alias key will not be visible to any interposers, as the TPM simply uses the public key that corresponds to the policy alias key to verify the signed challenge.

More particularly, aspects of the present disclosure enable a CPU with a device identity to derive an alias key to prove control of this identity to a TPM. One example context in which the proposed processes can occur is the Device Identifier Composition Engine (DICE) framework promulgated by the Trusted Computing Group (TCG).

The CPU identity value (e.g., $CDI_{fmc}$) can be used to generate a combined identity value for the CPU and TPM. The combined identity value for the CPU and TPM (e.g., $CDI_{tpm}$) can be used to derive a policy alias key (PolicyAliasKey). Generation of policy alias key in this fashion can enable CPU identity to be incorporated into TPM policies. While an interposer can still intercept the signed challenge and feed it to the TPM, this attack can be mitigated in a number of fashions. Thus, some example implementations benefit from the use of encrypted communication sessions between the CPU and TPM. For instance, communication sessions between the CPU and TPM can be encrypted (e.g., salted) using the EK of the TPM. In particular, in some implementations, when generating combined identity value (e.g., $CDI_{tpm}$), the CPU retrieves the public EK from the TPM, mixes it into the CDI derivation, and persists the public EK of the TPM in CPU memory. The CPU can then use the EK of the TPM to salt sessions. One benefit of using the EK of the TPM as described above is that it allows a system to require that the CPU is communicating with a specific TPM. In particular, an interposer or a different TPM cannot decrypt the seed as neither has access to the correct private EK of the TPM.

Another example aspect of the present disclosure is directed to approaches for securely delivering secrets from the TPM to the CPU. In particular, the primitives described herein can be used to ensure that a secret sealed to the TPM state can only be unsealed by and visible to a CPU with a specific policy alias key. This ensures that the secret can only be unsealed in a session initiated by the trusted CPU that has booted software matching the expected PCR measurements. The unseal operation can be done in a salted decrypt session to ensure that the unsealed secret is delivered to the caller encrypted with the current session key. This ensures that any interposer cannot read the plaintext secret from the bus.

The proposed techniques have a number of benefits, including ensuring that: an active interposer cannot modify/drop measurements into the TPM; an interposer cannot intercept plaintext secrets unsealed by the TPM; an interposer cannot satisfy TPM policies which require control of the CPU identity value; attestations can be made regarding the combined root of trust state of the CPU and TPM with a single policy; and it can be made evident to a verifier that a CPU only carried out or requested operations with a specific TPM.

With reference now to the Figures, example embodiments of the present disclosure will be discussed in further detail.

FIG. 1 depicts a block diagram of an example computing system 100 according to example embodiments of the present disclosure. The computing system 100 can include a central processing unit (CPU) 102 and a Trusted Platform Module (TPM) 122. The CPU 102 and the TPM 122 can communicate with each other over a communications bus 140.

In some implementations, the computing system 100 contains or is embodied as a single computing device, such as, for example, a personal computer, a laptop, an embedded device, a gaming console, a smartphone, a wearable device, a server computing device, etc. Thus, the CPU 102 and the TPM 122 can be included in the same physical device. In other implementations, the computing system 100 can include multiple computing devices communicating and operating in collaboration. Thus, in some instances, the CPU 102 and the TPM 122 can be contained in separate physical devices.

The communications bus 140 can include one or more wired or wireless connections. For example, in some implementations, the communications bus 140 can be a physical communications bus such as physical wiring or conductive traces on a circuit board. In some implementations, the CPU 102 and the TPM 122 can be communicatively connected via a single physical communications bus.

The CPU 102 can include one or more processors 104 and a memory 106. The one or more processors 104 can include any suitable processing device (e.g., a processor core, a microprocessor, an ASIC, an FPGA, a controller, a microcontroller, etc.) and can be one processor or a plurality of processors that are operatively connected. The memory 106 can include one or more non-transitory computer-readable storage media, such as RAM, ROM, EEPROM, EPROM, flash memory devices, magnetic disks, etc., and combinations thereof. The memory 106 can store data and instructions which are executed by the processor 104 to cause the central processing unit 102 to perform operations.

The memory 106 can also store a unique device secret (UDS) 108. The UDS can be a statistically unique, device-specific, secret value. The UDS can be generated externally and installed during manufacture or generated internally during device provisioning. The UDS can be stored in a non-volatile portion of memory 106, e.g., eFuses, or other suitably protected area to which access can be restricted.

The memory 106 can also store a set of first mutable code 110. The first mutable code 110 can also be referred to as "Layer 0" and can be the first computer language code (e.g., encoded as firmware) that is executed by the one or more processors upon boot of the CPU 102. As one example, the first mutable code 110 can include the Basic Input/Output System (BIOS) (also known as the System BIOS, ROM BIOS, BIOS ROM or PC BIOS), which is firmware used to provide runtime services for operating systems and programs and to perform hardware initialization during the booting process (power-on startup).

The central processing unit 102 can also include an authentication handler 112. The authentication handler 112 can include computer logic (e.g., embodied in computer-readable instructions) for performing authentication operations described herein. For example, the authentication handler 112 can perform the operations shown and described with reference to the CPU in FIG. 2. The authentication handler 112 can be embodied in hardware, firmware, or software.

The TPM 122 can include one or more processors 124 and a memory 126. The one or more processors 124 can include any suitable processing device (e.g., a processor core, a microprocessor, an ASIC, an FPGA, a controller, a microcontroller, etc.) and can be one processor or a plurality of processors that are operatively connected. The memory 126 can include one or more non-transitory computer-readable storage media, such as RAM, ROM, EEPROM, EPROM, flash memory devices, magnetic disks, etc., and combinations thereof. The memory 126 can store data and instructions which are executed by the processor 124 to cause the TPM 122 to perform operations.

The memory 126 of the TPM 122 can store a set of endorsement keys 128. For example, the endorsement keys 128 can include a public endorsement key and a private endorsement key. The TPM 122 can hold the private endorsement key secret. Thus, in some implementations, the endorsement keys 128 can be an asymmetric key pair.

The memory 126 of the TPM 122 can also store one or more secrets 130 (or, more generally, objects). Example secrets include passwords, certificates, or encryption keys. For example, TPM 122 can store the secret(s) 130 in one or more TPM shielded locations. Each TPM shielded location can be a location within the TPM 122 that contains data that is shielded from access by any entity other than the TPM 122 and which may only be operated on by a protected capability.

The TPM 122 can also include an authentication handler 132. The authentication handler 132 can include computer logic (e.g., embodied in computer-readable instructions) for performing authentication operations described herein. For example, the authentication handler 132 can perform the operations shown or described with reference to the TPM in FIG. 2. The authentication handler 132 can be embodied in hardware, firmware, or software.

Figure 2:
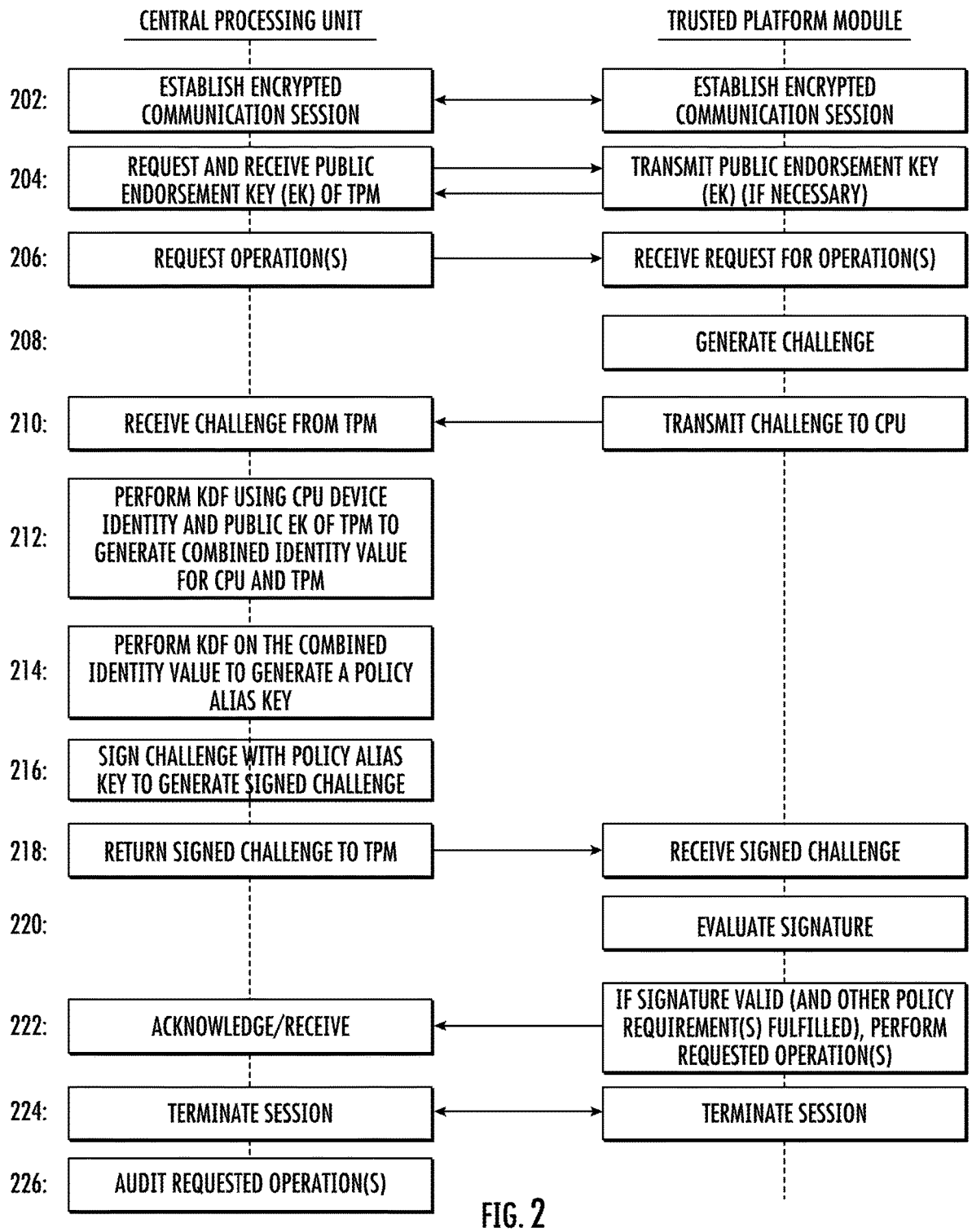
FIG. 2 depicts a swim lane diagram of an example communication session according to example embodiments of the present disclosure.

FIG. 2 depicts a swim lane diagram of an example communication session according to example embodiments of the present disclosure. The communication session illustrated in FIG. 2 is provided as one example only. Other sequences of operations or communications can occur as well.

At 202, the CPU and the TPM can establish an encrypted communication session. For example, the communication session can be established using a session key. In some implementations, the session key can be derived from or protected using the endorsement keys for the TPM (e.g., all communications from the CPU to the TPM can be encrypted using the public endorsement key for the TPM).

At 204, if desired, the TPM can provide the public endorsement key of the TPM to the CPU. In other implementations, the CPU may already have the public endorsement key of the TPM persisted in memory. In addition, in some implementations, the CPU may retrieve the public endorsement key of the TPM from an alternative source (e.g., a registry). The use of a public endorsement key associated with the particular TPM in the policy alias keys generation process results in a policy alias key that can be specifically tailored for the particular TPM. The actual CPU device identity value used to generate the policy alias key is not visible to any interposers due to the TPM utilizing the public key that corresponds to the policy alias key to verify the signed challenge.

At 206, the CPU can request one or more operations from the TPM. As examples, the operations can include storage of a secret or unsealing of a secret. Other operations are possible as well. The TPM can receive the request for operations. The TPM may evaluate a policy to determine whether to perform the operations. As one example, the policy may require that the CPU successfully provide a policy alias key.

To facilitate the CPU providing a policy alias key, at 208, the TPM can generate a challenge. For example, the challenge can be a random session nonce. A random session nonce can include generation of a random or semi-random number generated for a specific use (e.g., requesting the random number be provided responsive to the challenge). Nonce's can be utilized to generate a token that can be used exactly once to prevent replay attacks. At 210, the TPM can transmit the challenge to the CPU.

At 212, the CPU can perform an HMAC function using a CPU device identity value and the public endorsement key of the TPM to generate a combined identity value for the CPU and the TPM. As one example, the CPU device identity value can be a compound device identity (CDI) value. For example, the CDI value for the CPU can have been generated by the CPU by performing a key derivation function using a unique device secret (UDS) associated with the CPU and a hash of a first mutable code associated with the CPU.

At 214, the CPU can perform a key derivation function on the combined identity value to generate the policy alias key. For example, the key derivation function can be a function that generates an asymmetric key pair, where the policy alias key generated by the CPU corresponds to the private portion of the asymmetric key pair.

In some instances, the CPU with a device identity is enabled to derive an alias key to prove control of this identity to a TPM. For example, the process can occur in a Device Identifier Composition Engine (DICE) framework promulgated by the Trusted Computing Group (TCG). In the DICE framework, a CPU can have a DICE identity. For example, the DICE identity can be or can be used to generate a compound device identity (CDI) value that represents proof of the identity of the CPU and any measurements included in the CDI derivation (e.g., measurements indicative of the firmware or software running on the CPU).

In some implementations, the CPU can produce the CDI utilizing a key derivation function. For instance, the CDI value can be produced as follows:

$$CDI_{fmc} = KDF(UDS, FMC)$$

where UDS is the CPU's unique device secret, FMC is a hash of First Mutable Code (FMC) booted on the CPU, and KDF is a key derivation function. As one example, the key derivation function can be a hash-based message authentication code function. $CDI_{fmc}$ is one example of a CPU device identity value that can be used as described herein.

The CPU device identity value (e.g., $CDI_{fmc}$) can be used to generate a combined identity value for the CPU and TPM. For example, code running on the CPU can extend $CDI_{fmc}$ to make $CDI_{tpm}$ as follows:

$$CDI_{tpm} = KDF(CDI_{fmc}, EK_{pub})$$

where $CDI_{fmc}$ is as described above. $EK_{pub}$ is a hash of the public portion of the EK for the TPM with which the CPU is desiring to communicate. Again, one example key derivation function is a hash-based message authentication code function. Thus, $CDI_{tpm}$ is one example of a combined identity value for the CPU and TPM that can be used as described herein.

The combined identity value for the CPU and TPM (e.g., $CDI_{tpm}$) can be used to derive a policy alias key (PolicyAliasKey). The policy alias key can be an asymmetric keypair with a certificate signed by the CPU's DeviceID key. For example, in some implementations, the CPU can perform a key derivation function on the combined identity value to generate the policy alias key. Again, one example key derivation function is a hash-based message authentication code function.

Generation of policy alias key in this fashion can enable CPU identity to be incorporated into TPM policies. Specifically, as an example, given a CPU with a provable identity, TPM policies can be crafted which require a caller (e.g., the CPU) to prove control of its identity via the policy alias key. This can be referred to as satisfying a policy signed assertion. For example, the caller can be required to sign a challenge using the policy alias key. In particular, in some implementations, in order to satisfy the challenge for a given session, the caller must sign a session nonce (e.g., $nonce_{tpm}$) with the policy alias key. Because an interposer does not have access to the private policy alias key, the interposer cannot sign the challenge.

At 216, the CPU can sign the challenge with the policy alias key to generate a signed challenge. At 218, the CPU can return the signed challenge to the TPM.

While an interposer can intercept the signed challenge and feed it to the TPM, the present disclosure provides for mitigations to this attack. As one example, the ability for an interposer to intercept a signed challenge can be reduced by ensuring that communications sessions between the CPU and TPM are encrypted at the outset. For example, communication sessions between the CPU and TPM can be salted HMAC/encrypt sessions, in which the interposer cannot derive the sessionKey. As one example, the EK of the TPM can be used to protect the sessionKey to enable the encrypted communication session between the CPU and the TPM. Furthermore, because, in some implementations, the challenge for the CPU to sign is a session-specific nonce, if an interposer establishes a new communication session with the TPM session initiated by the interposer (e.g., for which the interposer knows the sessionKey), this new communication session will have a different session-specific challenge, making the signed challenge stolen from a previous session useless in the new context.

Thus, some example implementations benefit from the use of encrypted communication sessions between the CPU and TPM. In some implementations, communication sessions between the CPU and TPM can be encrypted (e.g., salted) using the EK of the TPM. In particular, in some implementations, when generating combined identity value (e.g., $CDI_{tpm}$), the CPU retrieves the public EK from the TPM, mixes it into the CDI derivation, and persists the public EK of the TPM in CPU memory. The CPU can then use the EK of the TPM to salt sessions. Specifically, the CPU can encrypt the salt to the persisted public EK of the TPM to ensure that all subsequent sessions are only established with the same TPM. This prevents an interposer from impersonating the trusted TPM later in boot by fooling the CPU into establishing a session with the interposer.

At 220, the TPM can evaluate (e.g., verify) the signed challenge. For example, the TPM can evaluate the signature/policy alias key using a public key that corresponds to the policy alias key. For example, the CPU can supply the public key that corresponds to the policy alias key to the TPM.

Thus, in some implementations, the CPU can sign the challenge with the private portion of the policy alias key, but never send the private key to the TPM. On the other hand, the TPM has the public portion of the policy alias key, which it can use to verify the signature of the nonce. While, in some instances, parties other than the TPM may be able to obtain access to the public portion of the policy alias key and verify the signature, any such party is still unable to obtain any information about the private portion of the policy alias key.

In some implementations, when the TPM is verifying the signature on the challenge at 220, the TPM may be evaluating a policy. For example, the policy may indicate or require that the challenge is signed by PolicyAliasKey and provide a copy of the public key. If the signature verification succeeds, then that part of the policy evaluation succeeds.

One benefit of using the EK of the TPM as described above is that it allows a system to require that the CPU is communicating with a specific TPM. In particular, an interposer or a different TPM cannot decrypt the seed as neither has access to the correct private EK of the TPM. In addition, if the EK of the TPM is different on subsequent boot cycles, the derived combined identity value (e.g., $CDI_{tpm}$) will also be different and therefore the CPU will use a different alias key to satisfy challenges (e.g., to satisfy a policy signed assertion).

At 222, if the signature is valid and any other policy requirements have been met, the TPM can perform the operation(s) that were requested at 206. For example, the TPM can store a new secret or unseal a stored secret. At 224, the CPU and the TPM can terminate the communication session.

In some implementations, the TPM may perform additional operations for proving to some other party (e.g., such as a remote verifier) that a particular policy was used to gate access to a particular object (e.g., a secret). As one example, the TPM can sign with a key that the TPM holds a statement that identifies the particular policy of the particular object. Trust in that TPM held key can be established/maintained via several standardized mechanisms. As another example, the particular policy can be attached to an encrypted object (e.g., called a "scaled" object). In this case the policy to be evaluated may have been created by whoever encrypted the object, and only the TPM can decrypt it and evaluate the policy. If the policy check fails, the TPM will refuse to give up the unsealed object.

At 226, the CPU can optionally audit the requested operations. If the audit detects that a requested operation was not performed correctly (e.g., a PCR extension was not completed (dropped, modified)), the CPU can destroy the most current policy alias key. This prevents the policy alias key from being used to satisfy policies when the CPU is unable to make measurements into the TPM. For instance, the audit can identify a failure to correctly complete at least one of the one or more operations. When the audit identifies the failure to correctly complete the operation(s), the CPU can destroy the policy alias key.

Another example aspect of the present disclosure is directed to approaches for detecting interposer interference with commands. As an example, for a standard salted TPM session an interposer can still modify/drop TPM commands, for example platform configuration register (PCR) extensions. The PCR can be a shielded location containing a digest of integrity measurements.

To prevent the interposer from modifying or dropping TPM commands without detection, the caller (e.g., the CPU) can establish an audit session. If the caller detects that a requested operation was not performed correctly (e.g., a PCR extension was not completed (dropped, modified)) it can destroy the current policy alias key. This prevents the policy alias key from being used to satisfy policies when host code is unable to make measurements into the TPM.

Although FIG. 2 and other portions of this disclosure focus on a CPU, the operations attributed to the CPU can be performed by a larger, more abstracted system. As one example, any trusted computing base (TCB) made up of any number of layers of TCB components can use the CDI for the highest layer of the TCB in place of the CPU device identity (e.g., as discussed at 212). Thus, the proposed approach can be extended to any TCB, beyond a CPU as such. Likewise, the disclosed techniques are also applicable outside of the DICE framework and can be used for any device that has a trusted device identity value.

Figure 3:
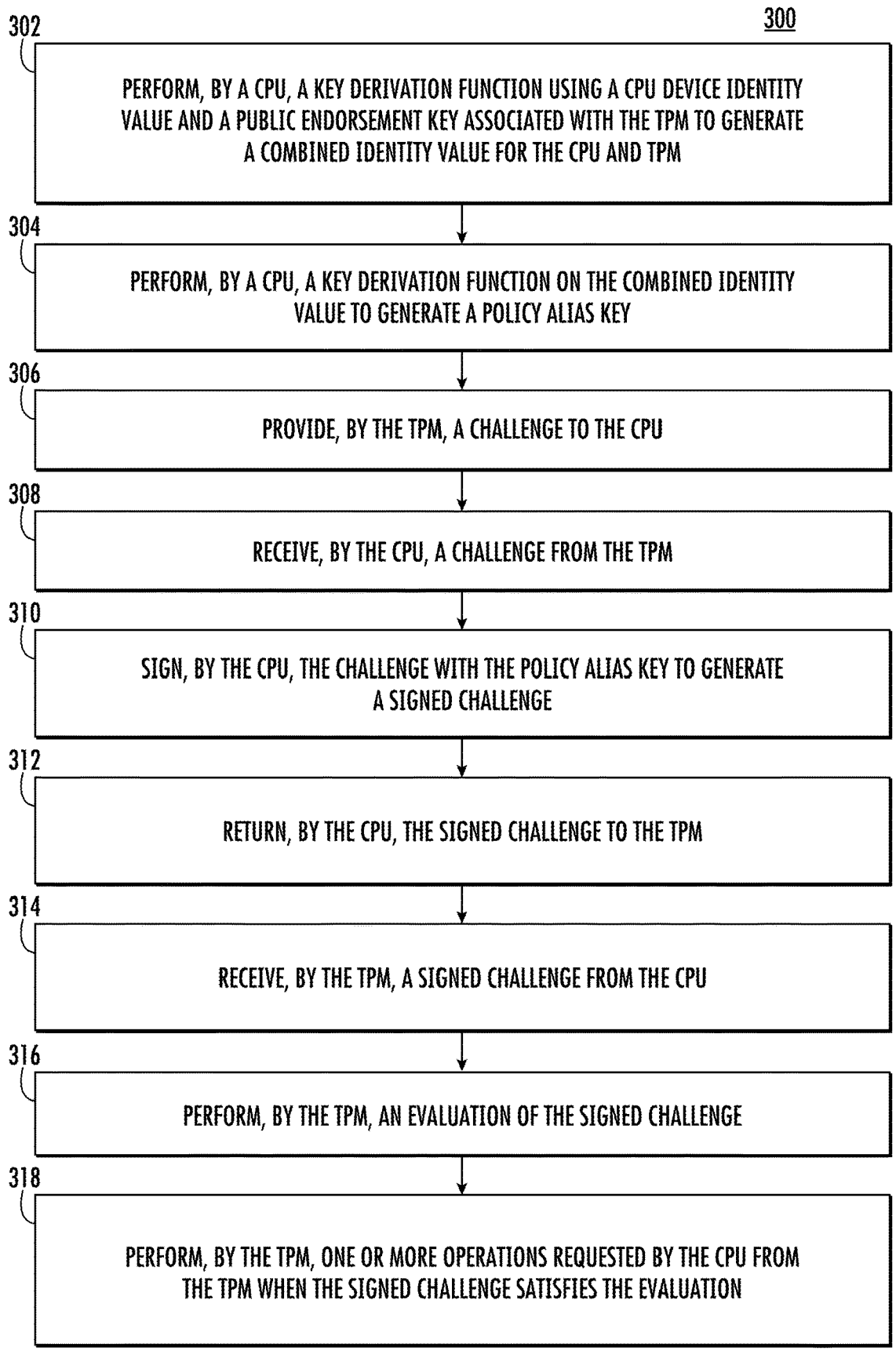
FIG. 3 depicts a flow chart diagram of an example method for demonstrating identity to a trust platform module according to example embodiments of the present disclosure.

FIG. 3 depicts a flow chart diagram of an example method to perform demonstration of an identity to a trusted platform model according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, or adapted in various ways without deviating from the scope of the present disclosure.

Method 300 can be performed by a computer system. The computer system, for example, can include a central processing unit (CPU) configured to communicate with a Trusted Platform Module (TPM) over a communication bus. The CPU can be configured to perform CPU operations to prove its identity to the TPM. The TPM can be configured to perform TPM operations to confirm an identity of the CPU. In some implementations, the communications bus can include a physical communications bus.

At 302, method 300 can include performing, by a CPU, a key derivation function using a CPU device identity value and a public endorsement key associated with the TPM to generate a combined identity value for the CPU and TPM. As described herein, the CPU device identity value can include a compound device identity (CDI) value for the CPU. Generating the CDI value for the CPU can include performing a key derivation function using a unique device secret (UDS) associated with the CPU and a hash of a first mutable code associated with the CPU.

At 304, method 300 can include performing, by a CPU, a key derivation function on the combined identity value to generate a policy alias key. For example, the key derivation function can be a function that generates an asymmetric key pair, where the policy alias key generated by the CPU corresponds to the private portion of the asymmetric key pair.

In some instances, the CPU with a device identity is enabled to derive an alias key to prove control of this identity to a TPM. For example, the process can occur in a Device Identifier Composition Engine (DICE) framework promulgated by the Trusted Computing Group (TCG). In the DICE framework, a CPU can have a DICE identity. For example, the DICE identity can be or can be used to generate a compound device identity (CDI) value that represents proof of the identity of the CPU and any measurements included in the CDI derivation (e.g., measurements indicative of the firmware or software running on the CPU).

In some implementations, the CPU can produce the CDI utilizing a key derivation function. For instance, the CDI value can be produced as follows:

$$CDI_{fmc} = KDF(UDS, FMC)$$

where UDS is the CPU's unique device secret, FMC is a hash of First Mutable Code (FMC) booted on the CPU, and KDF is a key derivation function. As one example, the key derivation function can be a hash-based message authentication code function. $CDI_{fmc}$ is one example of a CPU device identity value that can be used as described herein.

The CPU device identity value (e.g., $CDI_{fmc}$) can be used to generate a combined identity value for the CPU and TPM. For example, code running on the CPU can extend $CDI_{fmc}$ to make $CDI_{tpm}$ as follows:

$$CDI_{tpm} = KDF(CDI_{fmc}, EK_{pub})$$

where $CDI_{fmc}$ is as described above, $EK_{pub}$ is a hash of the public portion of the EK for the TPM with which the CPU is desiring to communicate. Again, one example key derivation function is a hash-based message authentication code function. Thus, $CDI_{tpm}$ is one example of a combined identity value for the CPU and TPM that can be used as described herein.

The combined identity value for the CPU and TPM (e.g., $CDI_{tpm}$) can be used to derive a policy alias key (PolicyAliasKey). The policy alias key can be an asymmetric keypair with a certificate signed by the CPU's DeviceID key. For example, in some implementations, the CPU can perform a key derivation function on the combined identity value to generate the policy alias key. Again, one example key derivation function is a hash-based message authentication code function.

Generation of policy alias key in this fashion can enable CPU identity to be incorporated into TPM policies. Specifically, as an example, given a CPU with a provable identity, TPM policies can be crafted which require a caller (e.g., the CPU) to prove control of its identity via the policy alias key. This can be referred to as satisfying a policy signed assertion. For example, the caller can be required to sign a challenge using the policy alias key. In particular, in some implementations, in order to satisfy the challenge for a given session, the caller must sign a session nonce (e.g., $nonce_{tpm}$)

with the policy alias key. Because an interposer does not have access to the private policy alias key, the interposer cannot sign the challenge.

In some implementations, method 300 can include regenerating, at a new boot session of the CPU, the policy alias key.

At 306, method 300 can include providing, by the TPM, a challenge to the CPU. In some implementations, the challenge can include a session nonce. At 308, method 300 can include receiving, by the CPU, a challenge from the TPM.

At 310, method 300 can include signing, by the CPU, the challenge with the policy alias key to generate a signed challenge. At 312, method 300 can include returning, by the CPU, the signed challenge to the TPM. In some instances, the challenge for the CPU can be to sign a session-specific nonce. This can provide for increased security against an interposer that has intercepted a signed challenge and fed it to the TPM. This is because with a session-specific nonce, each session is associated with a new session-specific challenge which makes a signed challenge stolen from a previous session useless in a new context.

At 314, method 300 can include receiving, by the TPM, a signed challenge from the CPU. The signed challenge can include the challenge singed by the CPU using a policy alias key. The policy alias key can be generated by the CPU by performance of a key derivation function on a combined identity value (CDI) for the CPU and TPM. The CDI for the CPU and TPM can be generated by the CPU by performing a key derivation function by the CPU on a CPU device identity value and a public endorsement key associated with the TPM. The CPU device identity value can include a CDI value for the CPU.

At 316, method 300 can include performing, by the TPM, an evaluation of the signed challenge. For example, the TPM can evaluate the signature/policy alias key using a public key that corresponds to the policy alias key. For example, the CPU can supply the public key that corresponds to the policy alias key to the TPM.

Thus, in some implementations, the CPU can sign the challenge with the private portion of the policy alias key, but never send the private key to the TPM. On the other hand, the TPM has the public portion of the policy alias key, which it can use to verify the signature of the nonce. While, in some instances, parties other than the TPM may be able to obtain access to the public portion of the policy alias key and verify the signature, any such party is still unable to obtain any information about the private portion of the policy alias key.

In some implementations, when the TPM is verifying the signature on the challenge at 220, the TPM may be evaluating a policy. For example, the policy may indicate or require that the challenge is signed by PolicyAliasKey and provide a copy of the public key. If the signature verification succeeds, then that part of the policy evaluation succeeds.

At 318, method 300 can include performing, by the TPM, one or more operations requested by the CPU from the TPM when the signed challenge satisfies the evaluation. The operations can include unsealing a secret stored by the TPM.

For instance, the primitives described herein can be used to ensure that a secret sealed to the TPM state can only be unsealed by and visible to a CPU with a specific policy alias key. For example, a secret can be sealed by the TPM with the following policy:
    PolicyPCR(expected measurements made by host code)
    PolicySigned(PolicyAliasKey)
    PolicyCommandCode(Unseal)

This ensures that the secret can only be unsealed in a session initiated by the trusted CPU that has booted software matching the expected PCR measurements. The unseal operation can be done in a salted decrypt session to ensure that the unsealed secret is delivered to the caller encrypted with the current session key. This ensures that any interposer cannot read the plaintext secret from the bus.

Figure 4:
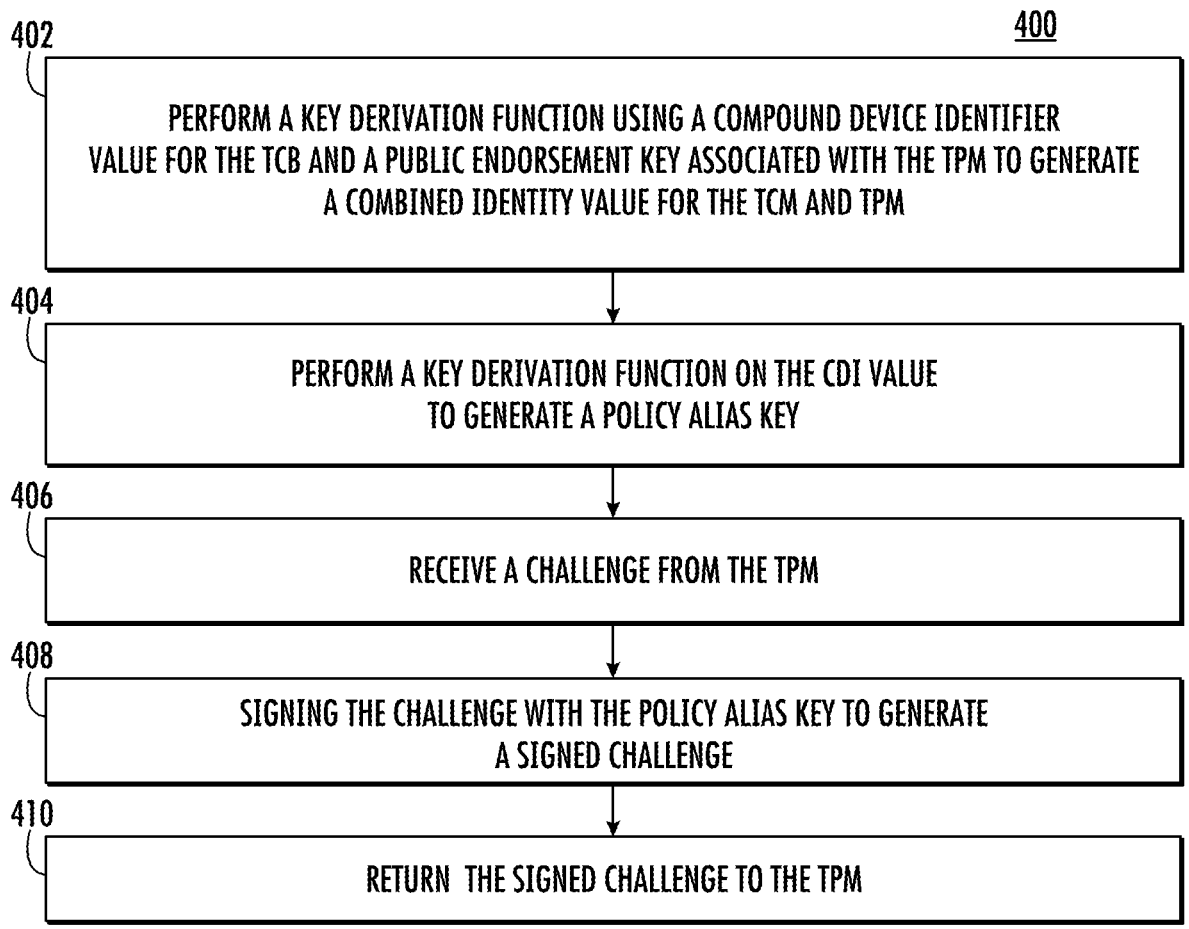
FIG. 4 depicts a flow chart diagram of an example method for demonstrating identity to a trust platform module according to example embodiments of the present disclosure.

FIG. 4 depicts a flow chart diagram of an example method to perform demonstration of an identity to a trusted platform model according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, or adapted in various ways without deviating from the scope of the present disclosure.

In some instances, the computer system can include a trusted computing base (TCB). The TCB can include multiple layers of TCB components. The TCB can be configured to communicate with a TPM over a communications bus. The TCB can be configured to perform TCB operations to prove an identity to the TPM.

At 402, method 400 can include performing a key derivation function using a compound device identifier (CDI) value for the TCB and a public endorsement key associated with the TPM to generate a combined identity value for the TCB and TPM. The CDI value for the TCB can include a secret value resulting from the sequential application for each of the plurality of layers of TCB components of a cryptographic one-way function to a combination of a respective secret value for the layer and a measurement of a subsequent layer.

At 404, method 400 can include performing a key derivation function on the CDI value to generate a policy alias key. For example, the key derivation function can be a function that generates an asymmetric key pair, where the policy alias key generated by the TCB corresponds to the private portion of the asymmetric key pair.

At 406, method 400 can include receiving a challenge from the TPM.

AT 408, method 400 can include signing the challenge with the policy alias key to generate a signed challenge. At 410, method 400 can include returning the signed challenge to the TPM. In some instances, the challenge for the CPU can be to sign a session-specific nonce. This can provide for increased security against an interposer that has intercepted a signed challenge and fed it to the TPM. This is because with a session-specific nonce, each session is associated with a new session-specific challenge which makes a signed challenge stolen from a previous session useless in a new context.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The depicted or described steps are merely illustrative and can be omitted, combined, or performed in an order other than that depicted or described; the numbering of depicted steps is merely for case of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computer system with improved security, the computer system comprising:
    a central processing unit (CPU) configured to communicate with a Trusted Platform Module (TPM) over a communications bus, wherein the CPU is configured to perform CPU operations to prove its identity to the TPM, the CPU operations comprising:
        performing a key derivation function using a CPU device identity value and a public endorsement key associated with the TPM to generate a combined identity value for the CPU and TPM;
        performing a key derivation function on the combined identity value to generate a policy alias key;
        receiving a challenge from the TPM;
        signing the challenge with the policy alias key to generate a signed challenge; and
        returning the signed challenge to the TPM.

2. The computer system of claim 1, wherein the CPU device identity value comprises a compound device identity (CDI) value for the CPU.

3. The computer system of claim 2, wherein generating the CDI value for the CPU comprises performing a key derivation function using a unique device secret associated with the CPU and a hash of a first mutable code associated with the CPU.

4. The computer system of claim 1, wherein the communications bus consists of a physical communications bus.

5. The computer system of claim 1, wherein the challenge comprises a session nonce.

6. The computer system of claim 1, wherein the CPU is configured to perform further operations comprising:
    regenerating, at a new boot session of the CPU, the policy alias key.

7. The computer system of claim 1, wherein the CPU is configured to perform further operations comprising:
performing an audit of one or more operations requested by the CPU from the TPM; and
when the audit identifies a failure to correctly complete at least one of the one or more operations, destroying the policy alias key.

8. The computer system of claim 1, further comprising the TPM.

9. The computer system of claim 8, wherein the TPM is configured to perform TPM operations to verify the identity of the CPU, the TPM operations comprising:
generating the challenge;
transmitting the challenge to the CPU;
receiving the signed challenge from the CPU;
validating the signed challenge; and
when the signed challenge is valid, performing one or more operations requested by the CPU from the TPM.

10. The computer system of claim 9, wherein performing the one or more operations requested by the CPU comprises unsealing a secret stored by the TPM.

11. A computer system with improved security, the computer system comprising:
a Trusted Platform Module (TPM) configured to communicate with a central processing unit (CPU) over a communications bus, wherein the TPM is configured to perform TPM operations to confirm an identity of the CPU, the TPM operations comprising:
providing a challenge to the CPU;
receiving a signed challenge from the CPU, wherein the signed challenge comprises the challenge signed by the CPU using a policy alias key, the policy alias key generated by the CPU by performance of a key derivation function on a combined identity value for the CPU and TPM, the combined identity value for the CPU and TPM generated by the CPU by performance of a key derivation function by the CPU on a CPU device identity value and a public endorsement key associated with the TPM;
performing an evaluation of the signed challenge; and
when the signed challenge satisfies the evaluation, performing one or more operations requested by the CPU from the TPM.

12. The computer system of claim 11, wherein the CPU device identity value comprises a compound device identity (CDI) value for the CPU.

13. The computer system of claim 12, wherein the CDI value for the CPU has been generated by performance by the CPU of a key derivation function using a unique device secret associated with the CPU and a hash of a first mutable code associated with the CPU.

14. The computer system of claim 11, wherein the communications bus consists of a physical communications bus.

15. The computer system of claim 11, wherein performing the one or more operations requested by the CPU comprises unsealing a secret stored by the TPM.

16. The computer system of claim 11, further comprising the CPU.

17. The CPU of claim 1, wherein the CPU device identity value comprises a compound device identity (CDI) value for the CPU, and wherein generating the CDI value for the CPU comprises performing a key derivation function using a unique device secret associated with the CPU and a hash of a first mutable code associated with the CPU.

18. The CPU of claim 1, wherein said receiving, signing, and returning are performed in response to a request by the CPU to store a secret at the TPM or unseal a secret from the TPM.

19. A computer system with improved security, the computer system comprising:
a hardware based trusted computing base (TCB) comprising a plurality of layers of TCB components, wherein the TCB is configured to communicate with a Trusted Platform Module (TPM) over a communications bus, wherein the TCB is configured to perform TCB operations to prove identity to the TPM, the TCB operations comprising:
performing a key derivation function using a compound device identifier (CDI) value for the TCB and a public endorsement key associated with the TPM to generate a combined identity value for the TCB and TPM, wherein the CDI value for the TCB comprises a secret value resulting from the sequential application for each of the plurality of layers of TCB components of a cryptographic one-way function to a combination of a respective secret value for the layer and a measurement of a subsequent layer;
performing a key derivation function on the combined identity value to generate a policy alias key;
receiving a challenge from the TPM;
signing the challenge with the policy alias key to generate a signed challenge; and
returning the signed challenge to the TPM.

* * * * *